United States Patent [19]

Butler

[11] Patent Number: 4,511,215

[45] Date of Patent: Apr. 16, 1985

[54] LIGHTWEIGHT DIAPHRAGM MIRROR MODULE SYSTEM FOR SOLAR COLLECTORS

[75] Inventor: Barry L. Butler, Golden, Colo.

[73] Assignee: The United States of America as represented by the United States Department of Energy, Washington, D.C.

[21] Appl. No.: 490,090

[22] Filed: Apr. 29, 1983

[51] Int. Cl.³ .................................................. G02B 7/18
[52] U.S. Cl. ...................................... 350/295; 350/628
[58] Field of Search ................ 350/295, 296, 310, 293

[56] References Cited

U.S. PATENT DOCUMENTS

| | | | |
|---|---|---|---|
| 3,229,578 | 1/1966 | Smith | 350/295 |
| 3,254,342 | 5/1966 | Miller | 350/295 |
| 3,420,598 | 1/1969 | Goss | 350/295 |
| 4,046,462 | 9/1977 | Fletcher et al. | 350/295 |
| 4,280,753 | 7/1981 | Neubauer | 350/295 |
| 4,288,146 | 9/1981 | Johnson et al. | 350/295 |

FOREIGN PATENT DOCUMENTS

| | | | |
|---|---|---|---|
| 473382 | 10/1937 | United Kingdom | 350/295 |
| 1060662 | 3/1967 | United Kingdom | 350/295 |
| 1129452 | 10/1968 | United Kingdom | 350/295 |

*Primary Examiner*—Jon W. Henry
*Attorney, Agent, or Firm*—Jeannette M. Walder; Paul A. Gottlieb; Judson R. Hightower

[57] ABSTRACT

A mirror module system is provided for accurately focusing solar radiation on a point or a line as defined by an array of solar collectors. Each mirror module includes a flexible membrane stretched over a frame in a manner similar to that of a drum or a trampoline and further includes a silvered glass or plastic mirror for forming an optical reflecting surface. The configuration of the optical reflecting surface is variably adjustable to provide for the accurate focusing of the solar energy on a given collector array, e.g., a point or a linear array arrangement. The flexible mirror-membrane combination is lightweight to facilitate installation and reduce system cost yet structurally strong enough to provide for the precise focusing of the incident solar radiation in a semi-rigid reflector system in which unwanted reflector displacement is minimized.

13 Claims, 5 Drawing Figures

14 10 16 14B 12 14A 12A 18 22 28 26 20 16 24 12B

LIGHTWEIGHT DIAPHRAGM MIRROR MODULE SYSTEM FOR SOLAR COLLECTORS

CONTRACTUAL ORIGIN OF THE INVENTION

The U.S. Government has rights in this invention under Contract No. EG-77-C-01-4042 between the U.S. Department of Energy and the Midwest Research Institute through its Solar Energy Research Institute Division.

BACKGROUND OF THE INVENTION

This invention relates generally to solar energy collector/concentrator systems and is particularly directed to an adjustable diaphragm mirror module for a solar collector providing for the accurate focusing of incident solar radiation.

Because of the virtually unlimited supply of energy of the sun and its availability, the conversion of solar radiation into other, more usable forms of energy has long been the subject of serious study and analysis. However, because the energy as solar radiation by its ever-present nature is so diffuse, attempts to convert solar energy to alternative forms have in the past been inefficient and impractical. Prior approaches to the conversion of solar radiation into a more usable form of energy have generally been characterized by the use of large and complex devices and their associated high cost, particularly with regard to the cost of designing and fabricating large, efficient optical surfaces and supporting apparatus used to focus the sun's rays.

Parabolic reflectors are generally employed for gathering and concentrating radiant energy from the sun for the purpose of providing heat which may be converted to other forms of energy. Such devices may be used in large numbers of movable mirrors turned towards the sun and inclined to one another in order to concentrate the rays reflected by the mirrors into a focus in which the center of a device utilizing solar energy, such as a heat exchanger, is positioned. Parabolic reflectors are also particularly useful in conjunction with space vehicles where solar energy can be converted to mechanical energy, which in turn can be utilized to generate electrical current, operate controls, and generally sustain spacecraft operations. The ideal solar concentrator would include a mirror assembly rigid enough to withstand various environmental defocusing forces such as wind, ground vibrational loads, etc., yet light enough in weight to facilitate installation and not require complex support and positioning components. Simplifying the structure of these solar concentrators will result in a corresponding reduction in the cost thereof, which is absolutely essential for their widespread acceptance and use on a commercial basis. Because of the various configurations of solar converters as utilized in heating, electrical and fuel systems, the ideal solar radiation concentrator should also be compatible with a variety of solar converters ranging from the single point focus to a linear focus.

OBJECTS AND SUMMARY OF THE INVENTION

Therefore, in view of the above, it is an object of the present invention to provide an improved solar energy collector system.

Another object of the present invention is to provide an improved glass or plastic reflecting module for a solar collector capable of focusing solar radiation on a point or a line and strong enough to withstand windloading without excessive weight and structure.

Still another object of the present invention is to provide a stressed membrane optical surface for focusing and collecting solar radiation.

A further object of the present invention is to provide a solar collector mirror module capable of being variably configured for the accurate focusing of solar radiation on a solar conversion device.

A still further object of the present invention is to provide a low cost, easily fabricated and installed, stretched membrane-type of glass or plastic reflector for use in a heliostat system.

Yet another object of the present invention is to provide a device for increasing the efficiency of parabolic reflectors utilized to concentrate solar radiant energy.

The present invention contemplates a mirror module system for concentrating solar radiation including a flexible membrane stretched on a frame and maintained thereon by means of a polymer or otherwise impregnated fabric material or metal sheet or mesh screen which exerts membrane tension in a drum-like manner. On one side of the flexible membrane is an optical reflecting surface which includes a suitable reflector, such as silvered glass securely bonded to the membrane. The composite reflector/stress member is attached to the frame by means of conventional coupling means, such as springs, to form the mirror module system. Nonuniform edge tension can be used to change the shape of the flexible membrane from a generally flat arrangement to a parabolic trough arrangement for enhanced solar radiation concentration.

In addition to the application of the aforementioned edge tension for the selective stretching of the flexible reflective membrane, tension may also be applied to selected areas of the membrane generally perpendicular to its reflective surface in forming the membrane into the appropriate optical shape, e.g., a parabolic dish or a parabolic trough. The latter forces which are not applied along the membrane's edge may be considered tuning forces for providing more precise control over membrane surface contour and resulting reflective characteristics.

Mirror modules of the present invention may be employed either individually or as a large collective assembly for use in heliostats, point focusing dishes and parabolic troughs. Each module is light in weight providing a weight to surface area ratio of 10 to 20 kg/m yet structurally strong enough to minimize membrane flutter due to environmental influences in maintaining high optical focusing accuracy.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

DETAILED DESCRIPTION OF THE PREFERRED EMBODIMENTS

Figure 1:
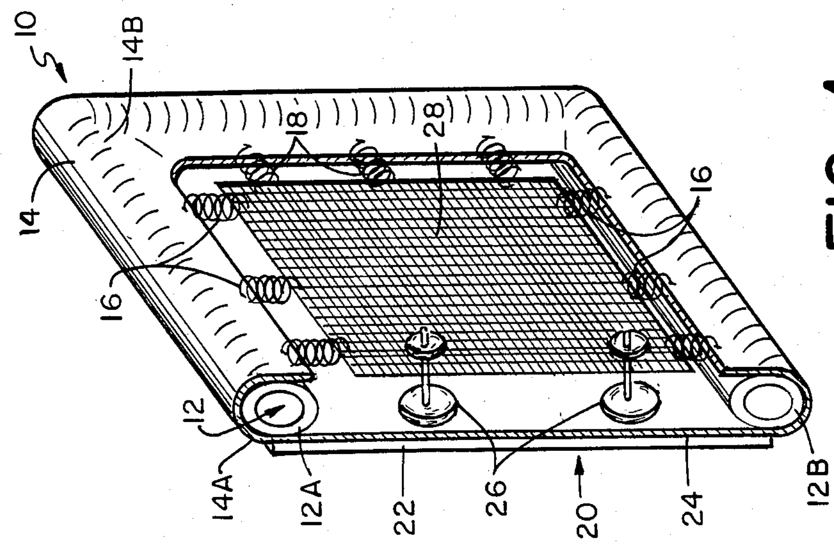
FIG. 1 is a partially cutaway perspective view of a diaphragm mirror module in accordance with the present invention shown in a flat configuration.

Referring to FIG. 1, there is shown a partially cutaway perspective view of a diaphragm mirror module 10 in accordance with the present invention for concentrating radiant solar energy for use with a solar conversion device (not shown) capable of converting the solar radiation into a more usable form of energy.

The mirror module 10 includes a structural frame 12 having a plurality of members such as upper and lower frame members 12A, 12B. Structural frame 12 also includes lateral frame members which are not shown in the figure. Although structural frame 12 and the general configuration of the mirror module 10 of the present invention is described herein as generally rectangular in shape, the present invention is not limited to this particular geometry and is capable of assuming virtually any geometrical shape defining the periphery thereof.

Positioned around the structural members of the frame 12 is a flexible membrane 14 so as to form a front surface 14A thereof on one side of the plane defined by structural frame 12 and a rear surface 14B on the other side of the plane of structural frame 12. The flexible membrane 14 is wrapped around the structural elements of the frame 12 so that its front surface 14A forms a complete and continuous cover over one side of the structural frame 12, while on the other side thereof the edge portions of the membrane 14 form an aperture. In another embodiment, membrane 14 does not wrap around structural frame 12, but rather is coupled and mounted to structural frame 12 by means of a plurality of elastic elements, such as springs to provide a trampoline-like configuration. On the continuous, front surface 14A of the flexible membrane 14 is securely positioned by means of an appropriate adhesive a silvered glass or polymer mirror 20 having a generally planar configuration. On the rear side of the structural frame 12 is positioned a supporting mesh grid 28 which is maintained in position by means of a plurality of vertical and horizontal springs 16, 18 securely coupling it to the edge portions of the rear surface 14B of the flexible membrane 14. The vertical and horizontal springs 16, 18, which in a preferred embodiment are simply coiled springs although other attachment means could be used such as a plurality of bunge cords, exert a tensile force on the flexible membrane 14 so as to securely position the flexible membrane 14 on the structural frame 12 in a stretched manner. This insures the structural integrity of the diaphragm mirror module 10 for maintaining the precise alignment of the reflecting surface thereof under the effects of wind or ground vibrational loads. The supporting mesh grid 28, while fully flexible, possesses a high tensile strength with regard to stretching forces applied thereto. The outer edge surfaces of the structural frame 12 are preferably smoothly curved in shape in order to avoid damage to the flexible membrane 14 when positioned thereon. Attached to the rear, inner portion of the front surface 14A of the flexible membrane 14 and to the supporting mesh grid 28 are a plurality of contour control elements 26, the structure and operation of which are fully described in the following paragraphs.

Figure 2:
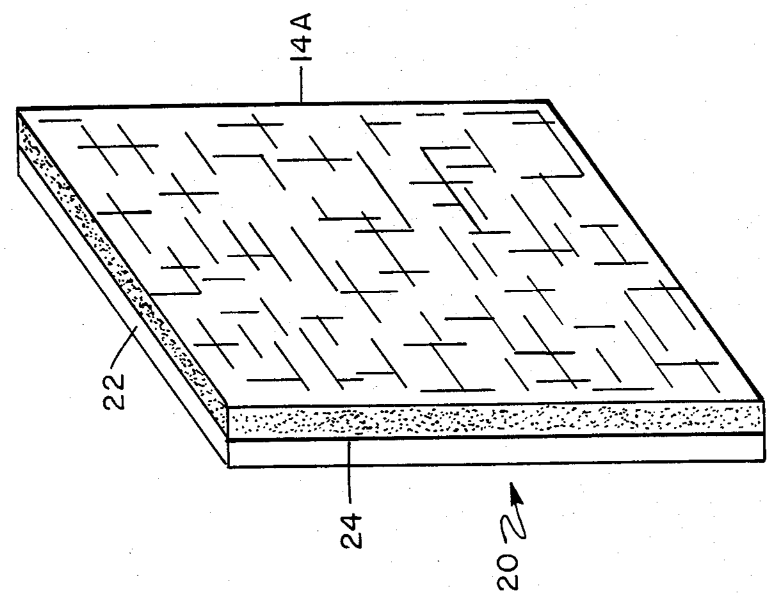
FIG. 2 is a perspective view showing in greater detail the semi-rigid membrane and silvered glass or metalized polymer mirror positioned thereon illustrated in FIG. 1.

The mirror/membrane combination is shown in greater detail in FIG. 2. The mirror 20 is second surfaced and includes a glass or polymer surface 22 positioned in front of a silver reflector 24. Securely mounted to the rear surface of the silvered glass or polymer mirror 20 by means of an appropriate adhesive such as silicon rubber is the front surface 14A of the flexible membrane 14.

Figure 3:
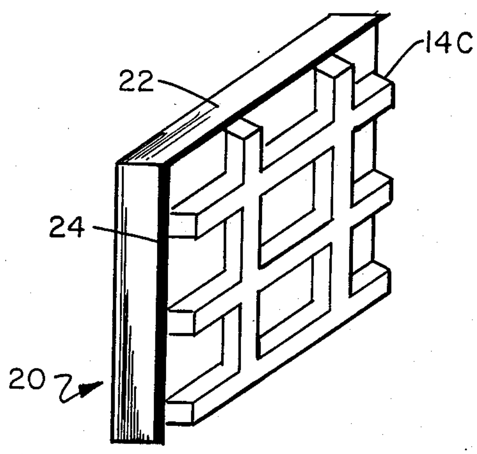
FIG. 3 is a perspective view of another embodiment of the membrane/mirror combination shown in FIG. 2 wherein the membrane is comprised of an open weave material.

Shown in FIG. 3 is a second embodiment of the flexible membrane 14C. This embodiment of the flexible membrane is constructed from an open weave material having a high tensile strength and includes first and second pluralities of linear arrays oriented orthogonally with respect to one another. The silvered glass or polymer mirror 20 including the glass or polymer surface 22 and silver reflector 24 are secured to one side of the grid-like embodiment of flexible membrane 14C shown in FIG. 3. The individual elements of the grid forming structure of the flexible membrane 14C are coated with a suitable insulating material for the protection thereof against excessive heat and other environmental factors. The embodiment of the flexible membrane shown in FIG. 3 reduces the weight of the diaphragm mirror module of the present invention without sacrificing the structural integrity and strength thereof.

Figure 4:
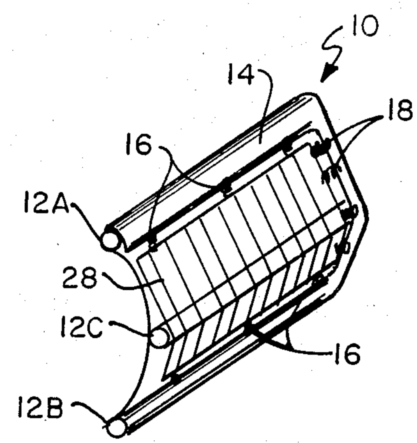
FIG. 4 is a perspective view of the diaphragm mirror module of the present invention formed into a parabolic shape.

Referring to FIG. 4, there is shown the diaphragm mirror module 10 of the present invention shaped in the form of a parabolic trough. The parabolic shape of the diaphragm mirror module 10 of FIG. 4 can be produced from the basic configuration of the present invention shown in FIG. 1 by appropriately selecting the tensile strength values of the vertical and horizontal springs 16, 18 utilized therein for coupling the flexible membrane 14 to the supporting mesh grid 28. By including a plurality of horizontal springs 18 having larger tensile strength values than the vertical springs 16 therein, the horizontal force applied across the flexible membrane 14 will be greater than that applied vertically thereto by the vertical springs 16. This orthogonal force differential applied across the flexible membrane 14 and the structural frame 12 upon which it is mounted results in the bending of the combination along the axis perpendicular to that of the stronger transverse force applied thereto. The thus formed parabolic shape of the silvered glass or plastic mirror positioned on the front surface of the flexible membrane 14 provides for the focusing of the solar radiation incident thereon and concentrates the thus reflected solar energy. Since FIG. 4 represents a partially cutaway perspective view of a parabolic shaped diaphragm mirror module 10 in accordance with the present invention, those portions of the flexible membrane and the structural frame 12 on the left hand portion of the figure have been omitted for the sake of clarity.

Figure 5:
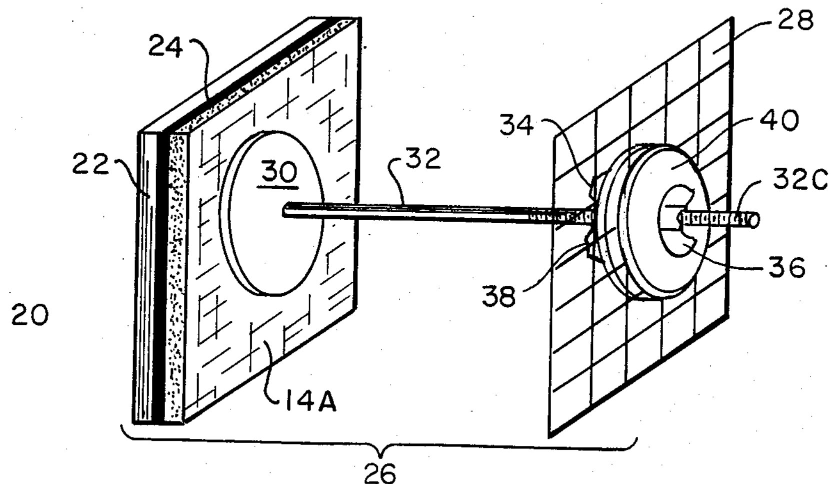
FIG. 5 shows the structure for precisely adjusting the shape of the surface of the diaphragm mirror module in providing a tuning capability therein for more efficient focusing and collecting of solar radiation incident thereon.

Referring to FIGS. 1 and 5, the structure and operation of the contour control elements 26 will now be explained. Each contour control element 26 includes a screw adjustable stud 32 having at one end thereof a base element 30 mounted thereon and at the other end thereof a threaded portion 32C. The distal side of the base element 30 with respect to the adjustable stud 32 is securely affixed by means of the appropriate adhesive material or lacing to the inside portion of the front surface 14A of the flexible membrane 14. Threadably mounted on the threaded portion of the adjustable stud 32 are inner and outer wing nuts 34, 36. Interposed between the aforementioned inner and outer wing nuts 34, 36 are inner and outer spacers/washers 38, 40. Positioned between the inner and outer spacers/washers 38, 40 is the supporting mesh grid 28 through which the adjustable stud 32 extends. The inner and outer spacers/washers 38, 40 are thus held in place by engagement with the respective sides of the supporting mesh grid 28. By rotating the inner and outer wing nuts 34, 36, the stud 32 may be displaced along the length thereof. With the stud 32 thus displaced along its lengthwise axis, the base element 30 coupled thereto may also be selectively displaced resulting in the displacement of that portion of the silvered glass or plastic mirror/flexible membrane combination securely coupled thereto. Thus, although the silvered glass or plastic mirror 20 would generally be a semi-rigid structure, slight changes may be made in the contour of its surface to improve its directivity in reflecting solar radiation incident thereupon. By maintaining the supporting mesh grid 28 tightly between the inner and outer spacers/washers 38, 40 by appropriate rotation of the inner and outer wing nuts 34, 36, the rigidity under tension of the supporting mesh grid 28 is coupled to the silvered glass mirror 20 by means of the adjustable stud 32 for enhancing the structural integrity of the reflecting surface and making it less susceptible to undesirable environmental disturbances.

There has thus been shown a diaphragm mirror module for use in a solar radiation concentrator/collector system which is lightweight yet of sufficient strength to withstand the effects of wind or ground vibrational loads so as not to degrade the focusing of incident solar radiation. The reflecting surface and its supporting frame may be easily formed into any of the more common reflector shapes such as that of a plane, spherical section or a parabola. In addition, the contour of the reflecting surface may be precisely adjusted in "tuning" the diaphragm mirror module for increasing its reflective efficiency in providing for the greater concentration of radiant solar energy incident thereupon. The present invention is particularly adapted for use in a heliostat, a point focusing dish, or a parabolic trough type of solar radiation concentrator.

While particular embodiments of the present invention have been shown and described, it will be apparent to those skilled in the art that changes and modifications may be made therein without departing from the invention and its broader aspects. The aim of the appended claims, therefore, is to cover all such changes and modifications as fall within the true spirit and scope of the invention.

The embodiments of the invention in which an exclusive property or privilege is claimed are defined as follows:

1. A solar energy concentrator comprising:

a frame having a peripheral edge portion thereof and defining a plane;

a semi-rigid membrane positioned on said frame so as to engage the edge portion thereof and extend over the entire frame on a first side of the plane thereof and over a portion of the frame on a second side of the plane thereof;

engaging means securely coupled to the edge portions of said membrane on the second side of the plane of said frame for applying tension to said membrane;

support means coupled to said engaging means for securely positioning said membrane on said frame in a stretched manner;

a flexible optically reflective surface positioned on an outer surface of said membrane on the first side of the plane of said frame; and adjustable displacement means coupling said support means and an inner surface of said membrane positioned on the first side of the plane of said frame for selectively changing the surface contour of said optically reflective surface and the focusing characteristics thereof with regard to solar radiation incident thereon.

2. A solar energy concentrator in accordance with claim 1 wherein said optically reflective surface includes a silvered glass or plastic mirror.

3. A solar energy concentrator in accordance with claim 1 wherein said engaging means includes a plurality of coiled spring elements each securely coupled at one end to an edge portion of said membrane and at the other end thereof to said support means.

4. A solar energy concentrator in accordance with claim 1 wherein said engaging means includes a plurality of stretchable elements each coupled at one end to an edge portion of said membrane and at the other end thereof to said support means.

5. A solar energy concentrator in accordance with claim 1 wherein said support means comprises a mesh grid structure including a peripheral portion thereof to which said engaging means is securely coupled.

6. A solar energy concentrator in accordance with claim 1 wherein said membrane comprises a continuous sheet of flexible material having high tensile strength.

7. A solar energy concentrator in accordance with claim 1 wherein said membrane comprises a flexible lattice structure including a plurality of crossed support ribs having high tensile strength.

8. A solar energy concentrator in accordance with claim 1 wherein said frame and said membrane have an equal number of corresponding linear edge portions.

9. A solar energy concentrator in accordance with claim 1 wherein said displacement means includes a pin having a base portion and a threaded portion at respective ends thereof and threaded means for variably engaging the threaded portion of said pin along a portion of the length thereof wherein said base portion is coupled to the inner surface of said membrane and said threaded means is coupled to said support means.

10. A solar energy concentrator in accordance with claim 9 wherein said threaded means includes first and second nut and washer combinations each positioned on a respective side of said support means whereby the surface contour of said optically reflective surface may be changed by linearly displacing said pin and the base portion thereof by the rotation of said first and second nuts.

11. A solar energy concentrator comprising:

a semi-rigid frame having a plurality of edge portions and defining a plane;

a semi-rigid membrane positioned on said frame and including a plurality of edge portions with each edge portion thereof oriented generally parallel in a paired manner with a corresponding edge portion of said frame when said membrane is positioned on said frame so as to extend over the entire frame on a first side of the plane thereof and over a portion of the frame on a second side of the plane thereof;

engaging means securely coupled to the edge portions of said membrane on the second side of the plane of said frame for applying tension to said membrane;

support means coupled to said engaging means for securely positioning said membrane on said frame in a stretched manner; and an optically reflective surface positioned on an outer surface of said membrane on the first side of the plane of said frame whereby the curvature of said frame and said membrane may be selectively adjusted so as to change the surface contour of said optically reflective surface by varying the tension applied to said membrane by said engaging means.

12. A solar energy concentrator in accordance with claim 11 wherein said frame is rectangular in shape with said membrane including four edge portions each oriented parallel to a respective side of said rectangular frame when positioned thereon and wherein said frame and said optically reflective surface may be formed into a generally parabolic shape by increasing the tension applied to a first pair of facing edge portions of said membrane over that applied to a second pair of facing edge portions thereof.

13. In a solar energy collector including an optically reflective surface positioned on a flexible membrane and further including a semi-rigid frame upon which said membrane is positioned in a stretched manner under tension, the improvement comprising:

first means for applying a first tension force $F_1$ between said membrane and said frame along a first axis of said membrane and second means for applying a second tension force $F_2$ between said membrane and said frame along a second axis of said membrane, where $F_1 > F_2$ and said first and second axes are mutually orthogonal, so as to bend the combination of said frame and membrane along said second axis in a generally concave shape relative to the solar energy incident thereupon for focusing said incident solar energy.

* * * * *